United States Patent [19]
Yokoyama et al.

[11] Patent Number: 5,291,285
[45] Date of Patent: Mar. 1, 1994

[54] TELEVISION SIGNAL LEVEL METER

[75] Inventors: Itoshi Yokoyama, Tokyo; Masaaki Nagai; Kakuya Saito, both of Kanagawa, all of Japan

[73] Assignee: Leader Electronics, Yokohama, Japan

[21] Appl. No.: 890,135

[22] Filed: May 29, 1992

[30] Foreign Application Priority Data

May 31, 1991 [JP] Japan ................... 3-129567

[51] Int. Cl.⁵ .......................... H04N 17/00
[52] U.S. Cl. .................. 348/180; 348/185; 348/739
[58] Field of Search .......... 358/139, 10, 230; H04N 17/00

[56] References Cited

U.S. PATENT DOCUMENTS 4,058,826 11/1977 Schneider ............ 358/139 X
4,685,065 8/1987 Braun et al. .
5,166,791 11/1992 Crawford ............ 358/139
5,216,492 6/1993 Borrough et al. ...... 358/139 X

FOREIGN PATENT DOCUMENTS 55-150572 10/1980 Japan .

OTHER PUBLICATIONS

"Bandscope Technology of Marantz' Wide-Band Receiver AX700", HAM Journal, No. 59, 1989, pp. 62-67.
Leader Electronics Corp. TV-VHF/UHF/DBS IF Level Meters 1989 catalog.
Meters WINDOW II and WINDOW LITE catalog, 1991 (exact date unknown).
Catalog and User's Manual of "TV Field Strength Measuring Instrument Model NLC-W901" sold by Nippon Antenna Co. (exact date of publishing unknown).

Primary Examiner—Victor R. Kostak
Attorney, Agent, or Firm—Fish & Richardson

[57] ABSTRACT

A television signal level meter is provided which is capable of simultaneously displaying levels for a multitude of television channels in a scale having a variable dynamic range. The television meter includes a level image forming means for displaying signal levels of a multitude of channels, a scale forming means for forming a scale suitable for simultaneously displaying the signal levels of the channels, and an image forming means for displaying channel numbers associated with the channels.

8 Claims, 6 Drawing Sheets

TELEVISION SIGNAL LEVEL METER

BACKGROUND OF THE INVENTION

1. Field of the Invention

This invention relates to a television (TV) signal level meter (electric field strength meter), and more particularly to a meter of this kind for use in measuring and displaying an electric field strength of a radio wave of each television channel included in the VHF/UHF ranges or the like.

2. Prior Art

Conventionally, a TV signal level meter or a spectrum analyzer is used for measuring an electric field strength of a radio wave received in a TV channel. The TV signal level meters may be classified into a single channel type and a multi-channel type. One such single channel type TV meter is a VHF/UHF signal level meter LFC-945 manufactured by the present assignee which is adapted to measure and indicate an electronic field strength level of a selected single channel. On the other hand, one type of multi-channel type TV signal level meter is MODEL NLC-W901 manufactured by Nippon Antenna Co., which simultaneously measures and indicates electric field strength levels of up to a predetermined number of channels (for example seven channels). A spectrum analyzer, though not exclusively employed for the measurement of TV signal levels, can also be used for measuring the electric field strength magnitudes of TV channels since it can display the levels of received signals within a certain frequency range.

Since the above-mentioned single channel type TV signal level meter cannot simultaneously display electric field strength levels of a plurality of channels, it takes a long time to measure the levels of a large number of channels. In condominiums and apartment complexes and so on, it has been required that outputs from an installed common antenna to respective dwelling units must have signal levels not lower than a predetermined value at any channel. In meeting such a requirement, adjustment of the antenna by using a single channel type TV meter requires a great deal of labor. Further, since the number of channels which require measurements of signal levels has been increasing with the recently widespread installation of a city-type CATV or the like, the labor for measuring and checking signal levels of these channels becomes immense.

This problem can be alleviated to some extent by the foregoing multi-channel type TV signal level meter MODEL NLC-W901. This TV level meter, however, divides a measurable level range into a high region (60-100 dBμ) and a low region (30-70 dBμ) and thus has a narrow dynamic range for the simultaneous display of measured results. Specifically, if there is a large difference in level among channels, the measured levels of all channels cannot be displayed at one time. Thus, the TV signal level meter of this model is not suitable for the requirement of the collective residence. The model also suffers a drawback that selection and change of channels to be measured take much time.

If a spectrum analyzer is employed for measuring TV channel signal levels, the levels of all signals present within a certain frequency range are displayed. Due to this, it is inconvenient to find the signals of TV channels to be measured. There is another drawback that the device itself is very expensive.

SUMMARY OF THE INVENTION

In view of the above-mentioned problems, an object of the present invention is to provide a TV signal level meter which is capable of measuring and simultaneously indicating the levels of signals for a multitude of TV channels.

The above object is realized by a TV signal level meter according to the present invention which comprises: (a) channel setting means for setting a plurality of television channels, the levels of which are to be measured; (b) level measuring means coupled to receive an input for detecting the level of a signal received in each of the plurality of television channels from the input and storing the detected signal levels; and (c) display means responsive to the plurality of television channels from the channel setting means and a plurality of said stored signal levels from the level measuring means, including: (c1) a plurality of level image display regions for displaying signal levels for the respective channels in a given form of image in a predetermined scale; and (c2) a plurality of channel number image display regions for displaying channel numbers associated with the respective channels, the positions of the plurality of channel number image display regions being correlated to the plurality of level image display regions, respectively.

According to the present invention, the display means may further include display control means which comprises: (a) scale forming means responsive to the plurality of stored signal levels for detecting maximum and minimum values thereof and forming the predetermined scale having a range depending on the values; (b) level image forming means responsive to the plurality of stored signal levels for forming the level images representing the signal levels; and (c) number image forming means responsive to the plurality of channels for forming number images representing the numbers for the channels, respectively.

According to the present invention, the TV meter may further comprise means for specifying in the plurality of channels at least one channel the signal level of which is to be displayed by a numerical value. The display means may further comprise at least one numerical level value image display region for displaying a numerical level value image of a channel. Also, the display control means may comprise numerical level value image forming means responsive to a specified channel from the specifying means for forming an image representing the numerical value of the stored signal level of the specified channel.

DESCRIPTION OF THE PREFERRED EMBODIMENT

An embodiment of the present invention will hereinafter be described with reference to the accompanying drawings.

Figure 1:
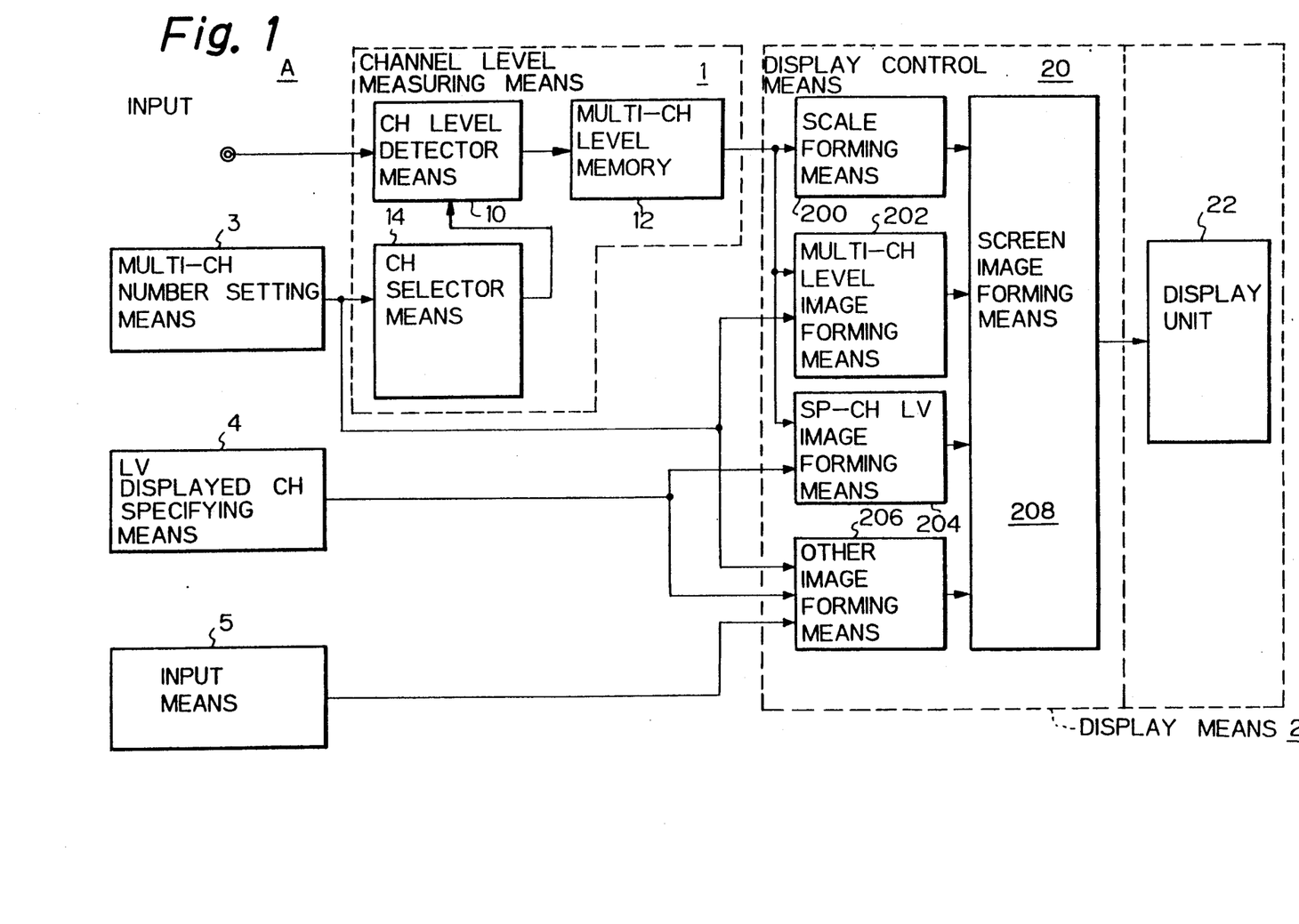
FIG. 1 is a block diagram illustrating the basic configuration of a TV signal level meter according to the invention.

Referring to FIG. 1, the basic configuration of a TV signal level meter A according to the invention is shown. The TV level meter A comprises a channel (CH) signal level measuring means 1, connected to an input terminal adapted to receive a signal input; a display means 2 connected to the measuring means 1; a setting means 3 for designating numbers of a multitude of channels to be measured; a specifying means 4 for specifying at least one channel whose level value (LV) measured is to be numerically displayed; and an input means 5 for other inputs.

The level measuring means 1 comprises a channel signal level detector means 10; a multi-channel signal level memory 12; and a channel selector means 14. The selector means 14 receives a multitude of designated channel numbers from the setting means 3 and selects one of the designated channels in each measurement cycle in order to sequentially output the selected channel numbers to the detector means 10. When an output from the selector means 14 is received, the detector means 10 detects and outputs the level of the components in the received input, which are in a frequency band associated with a selected channel. The level memory 12 then stores the detected level.

The display means 2 generally consists of a display control means 20 and a display unit 22. The display control means 20 includes four image forming means 200, 202, 204 and 206, as shown in FIG. 1, and a screen image forming means 208 which synthesizes images from the four image forming means to generate a screen image to be displayed. Specifically, the scale forming means 200 receives a multitude of detected levels stored in the level memory 12 and forms the image of a scale suitable for displaying the multitude of detected levels. The multi-channel level image forming means 202 receives the detected levels stored in the level memory 12 and a multitude of designated channel numbers from the setting means 3 to form images representing the magnitudes of levels for the respective channels. Preferably, such images may include bars each having a length corresponding to each level. The SP-CH numerical LV image forming means 204 receives the detected levels stored in the level memory 12 and a specified channel (SP-CH) number from the specifying means 4, and fetches the detected level for the specified channel to form a numerical image indicative of the level value (LV) of the detected level. The last image forming means 206 is connected to the setting means 3, the specifying means 4 and the input means 5. The means 206 forms relatively fixed images (for example, images for channel numbers and a channel specifying mark, and other character/graphic images) which constitute a screen image together with the aforementioned images.

When the foregoing formed images are received, the screen image forming means 208 synthesizes them in a certain selected format to form a screen image which is outputted to the display unit 22. Then, the display unit 22 displays it on the screen thereof.

Figure 2:
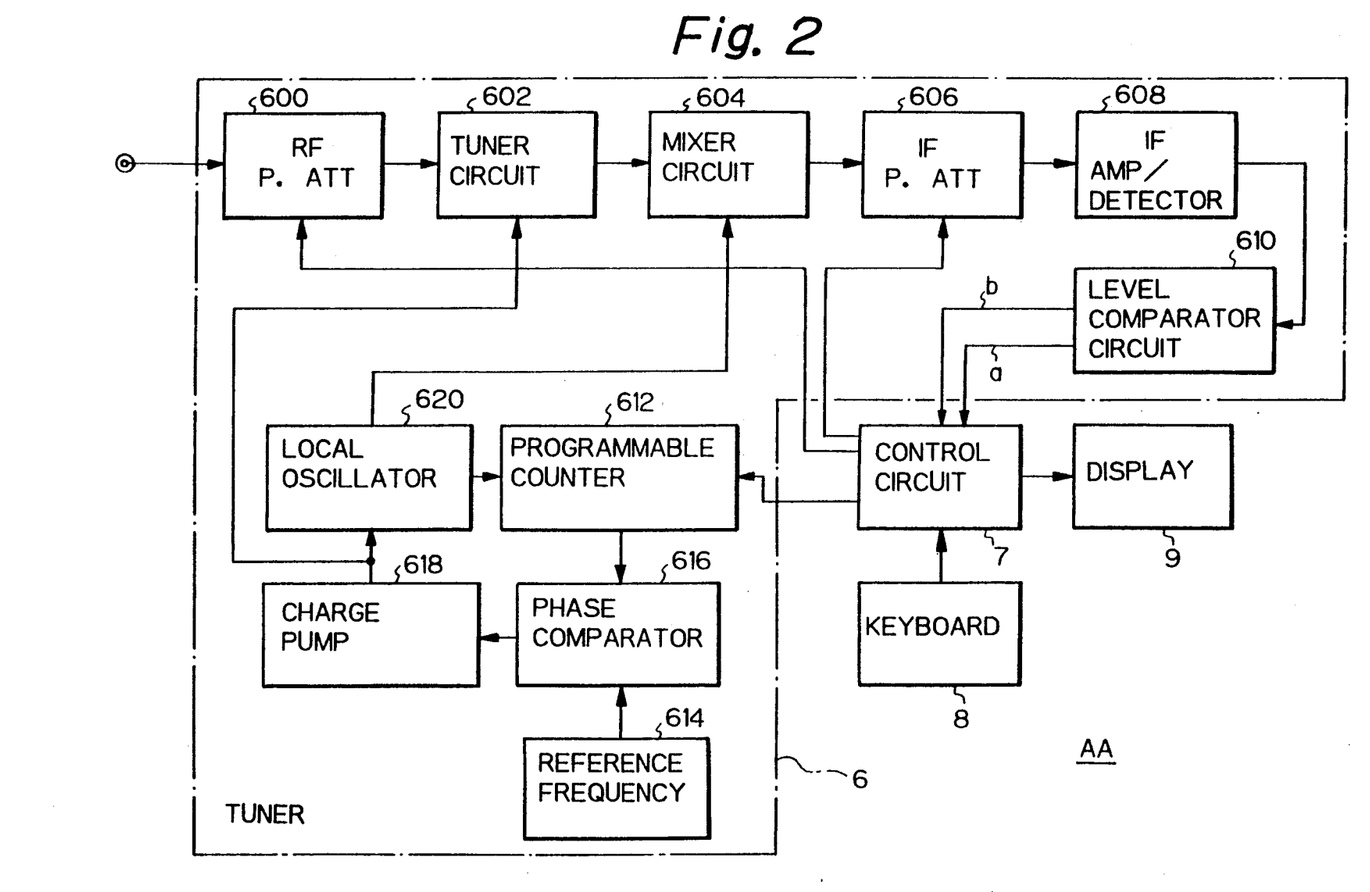
FIG. 2 is a circuit block diagram illustrating a TV signal level meter which embodies the basic configuration of the TV signal level meter shown in FIG. 1.

Referring now to FIG. 2, a TV signal level meter AA, which embodies the basic configuration of FIG. 1, will be described hereinafter. The TV level meter AA shown in FIG. 2 comprises a tuner 6; a control circuit 7 composed of a microcomputer with a memory; a keyboard 8; and a display 9. The tuner 6, which is a conventional one having an auto range function, has two programmable attenuators (P.ATTs) for the auto range function. More specifically, the tuner 6 includes a radio frequency (RF) programmable attenuator (P.ATT) 600 connected to an input terminal; an RF tuner circuit 602 receiving an attenuated output from the attenuator 600; a mixer circuit 604 connected to the output of the RF tuner 602; an intermediate frequency (IF) programmable attenuator (P.ATT) 606 connected to the output of the mixer 604; an IF amplifier/detector 608 receiving an attenuated output from the IF P.ATT 606; and a level comparator circuit 610 receiving an output from the IF amplifier/detector 608. In order to control the circuits 602 and 604, the tuner 6 is further provided with a programmable counter 612; a phase comparator connected to receive an output from the programmable counter 612 and an output from a reference frequency ($f_R$) circuit 614 (for example, $f_R = 50$ KHz); a charge pump circuit 618 coupled to receive an output from the phase comparator for generating a DC voltage; and a local oscillator circuit 620 coupled to receive the DC voltage outputted from the charge pump circuit 618 to apply an oscillation output to a second input of the mixer circuit 604. The DC voltage output generated by the charge pump circuit 618 is used to determine a tuned frequency for the tuner circuit 602 as well as an oscillation frequency $f_L$ for the local oscillator circuit 620.

Specifically, the programmable counter 612 divides the oscillation frequency $f_L$ from the local oscillator circuit 620 by a division ratio supplied from the control circuit 7 and applies the divided output to the phase comparator 616. The phase comparator 616 adjusts the DC voltage generated by the charge pump circuit 618 in such a direction that the difference between the frequency of the divided output and the reference frequency $f_R$ is decreased, thereby controlling the oscillation frequency of the local oscillator 620 to generate a local oscillation frequency dictated by the division ratio.

For the tuner 6 thus constructed, the control circuit 7 supplies the counter 612 with a division ratio associated with the frequency of a TV channel to be tuned, as stated above, as well as the two programmable attenuators 600, 606 with outputs for specifying respective attenuation ratios for the auto range operation. In the embodiment, the level comparator circuit 610 determines whether or not the IF output from the circuit 608 is within a dynamic range of 9 dB and supplies the control circuit 7 with a signal (via a line a) indicating "within the range", "above the range" or "below the range" together with a detected level (via a line b). When a signal other than that indicating "within the range" is outputted, the control circuit 7 changes a set of attenuation ratio specifying signals for the two P.ATTs 600, 606, as will be later described.

The control circuit 7 is provided with the keyboard 8 for a variety of inputs. The keyboard 8 has keys as seen on a control panel 80 in FIG. 3. The display 9 connected to the control circuit 7 has a LCD (liquid crystal display) screen 90 also shown in FIG. 3. The screen 90 is divided into a scale display region 91; a region 92 within the scale display region 91 for displaying level images, such as bars 97, associated with respective TV channels; a region 93 below the region 92 for displaying TV channel numbers; a region 94 for displaying digital values and other data for a specified channel (SP-CH); and a region for displaying other data items.

Figure 3:
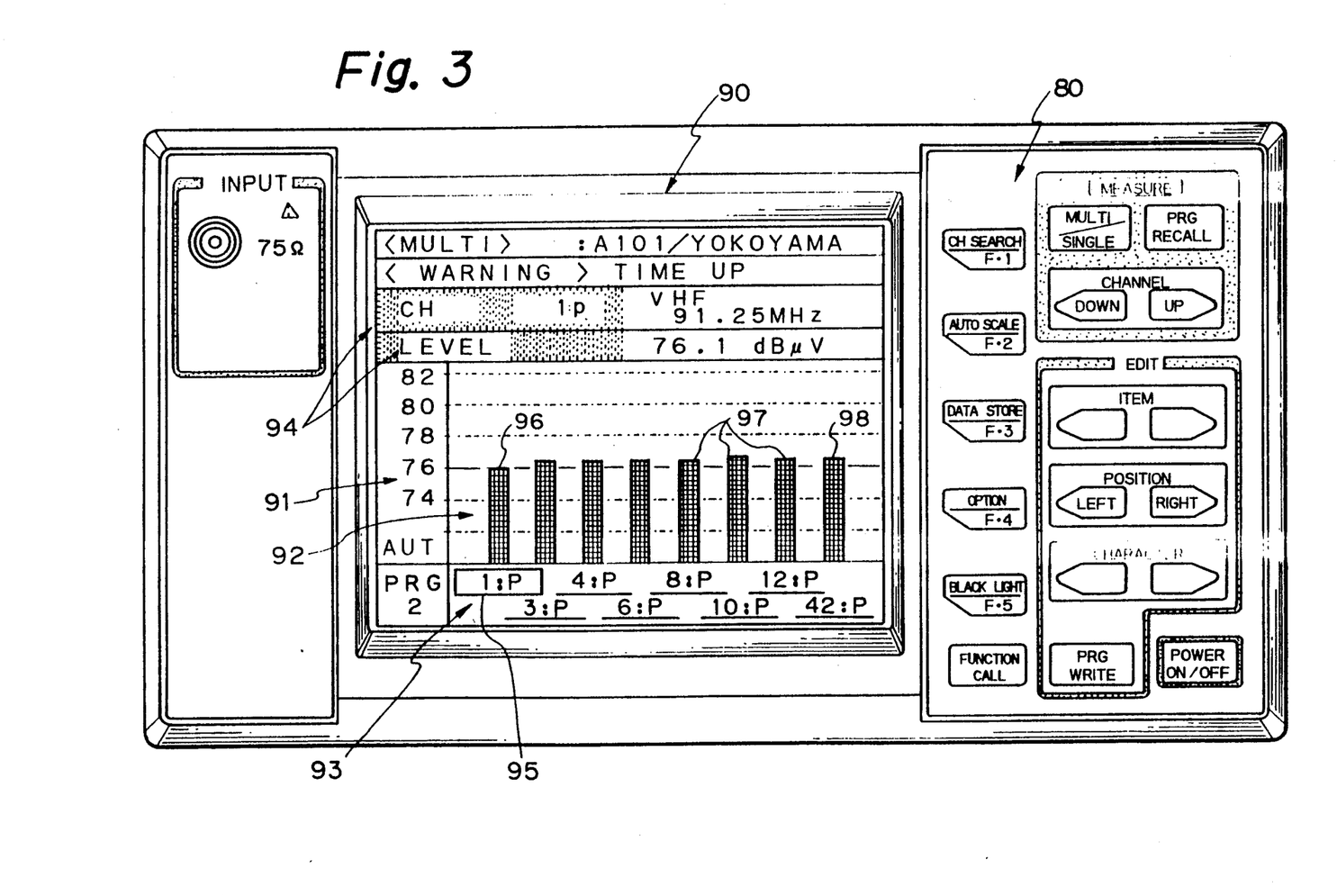
FIG. 3 is a diagram illustrating a front panel of the TV signal level meter shown in FIG. 2 including a control panel and a screen.

Keys on the keyboard 8 which are involved with the invention will be described. A "MULTI/SINGLE" key is used to switch between a multiple-bar graph display provided in accordance with the invention, and a single-bar graph display. A "PRG RECALL" key calls one of four channel groups PRG1-PRG4 in the multi-channel display. In FIG. 3, the channel group PRG2 is selected. Each group includes eight channels. "CHANNEL" keys are used to specify one among designated channels (i.e. a channel surrounded by a rectangle 95 or Channel 1 in FIG. 3) in order to display a digital level value thereof in the multiple-bar graph display. "ITEM" keys select an item to be edited among items, i.e. a received channel, PICTURE/SOUND (the initial character of "PICTURE" or "SOUND" is added after a channel number, such as 1:P or 4:P when PICTURE is selected), a frequency and so on. "POSITION" keys are used to select a position to be modified in a numerical value or a character string when an item selected by the "ITEM" key is a channel name, a frequency and so on represented by such a character string or a numerical value. "CHARACTER" keys are used to modify the contents of the position selected by the "POSITION" key. A "CH SEARCH" key is used to automatically measure signal levels of all of previously selected channels in the VHF and UHF bands, select 32 channels which exhibit larger signal levels, store the signal levels of the selected channels, and display the signal levels of all eight channels at a time in the multiple-bar graph mode. An "AUTO SCALE" key alternately switches between auto and manual switching for a level measurement range. A "DATA STORE" key is used to store data representing measured levels in the memory (which is capable of storing up to four sets of measured level data for groups of eight channels). A "FUNCTION CALL" key enables keys denoted "F-1", "F-2", "F-3", "F-4" and "F-5" (including the same keys as the foregoing ones) to select one from a variety of other functions.

Figure 4A:
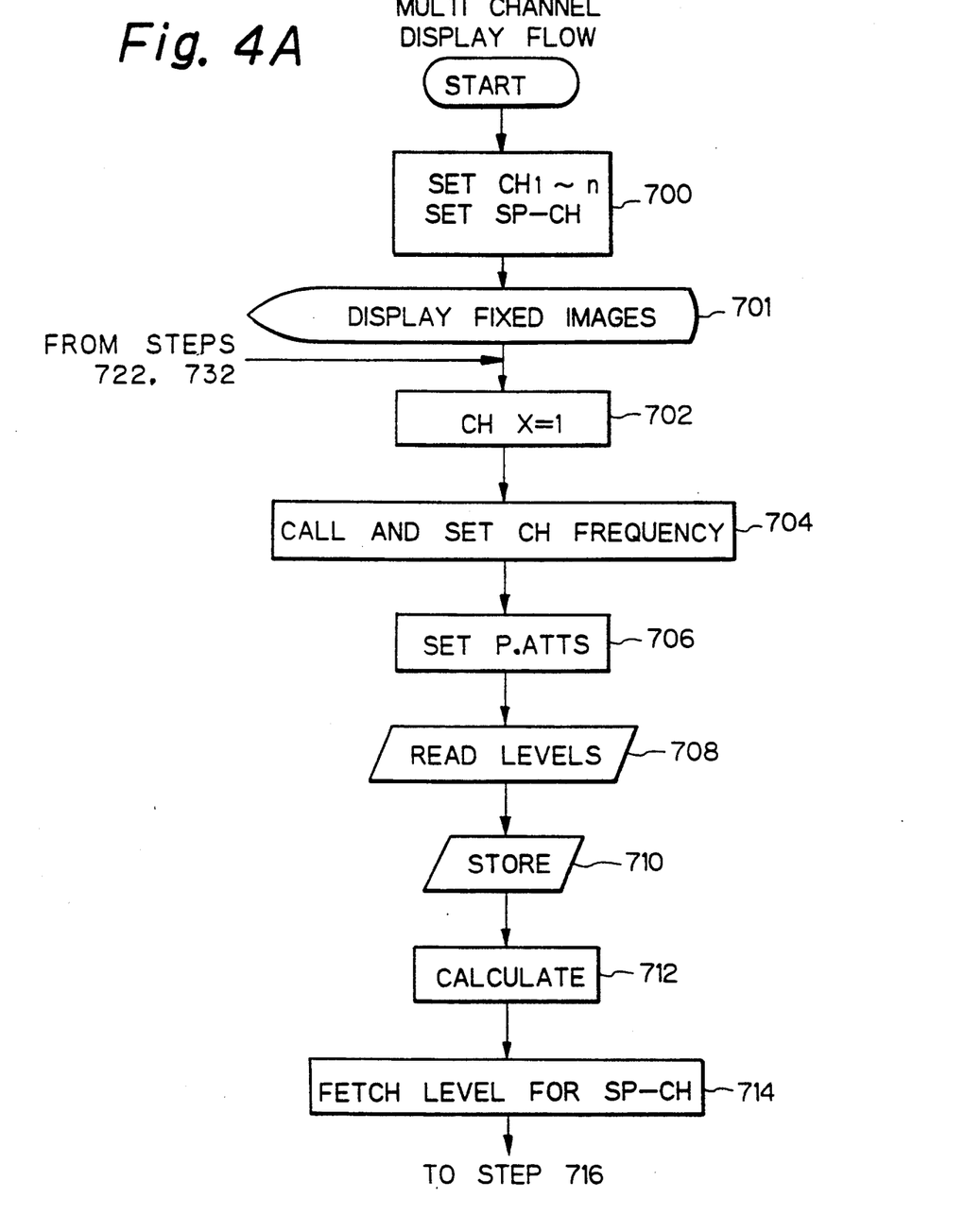
FIGS. 4A and 4B are flow charts illustrating multichannel display flow executed by a microcomputer constituting a control circuit shown in FIG. 2.
Figure 4B:
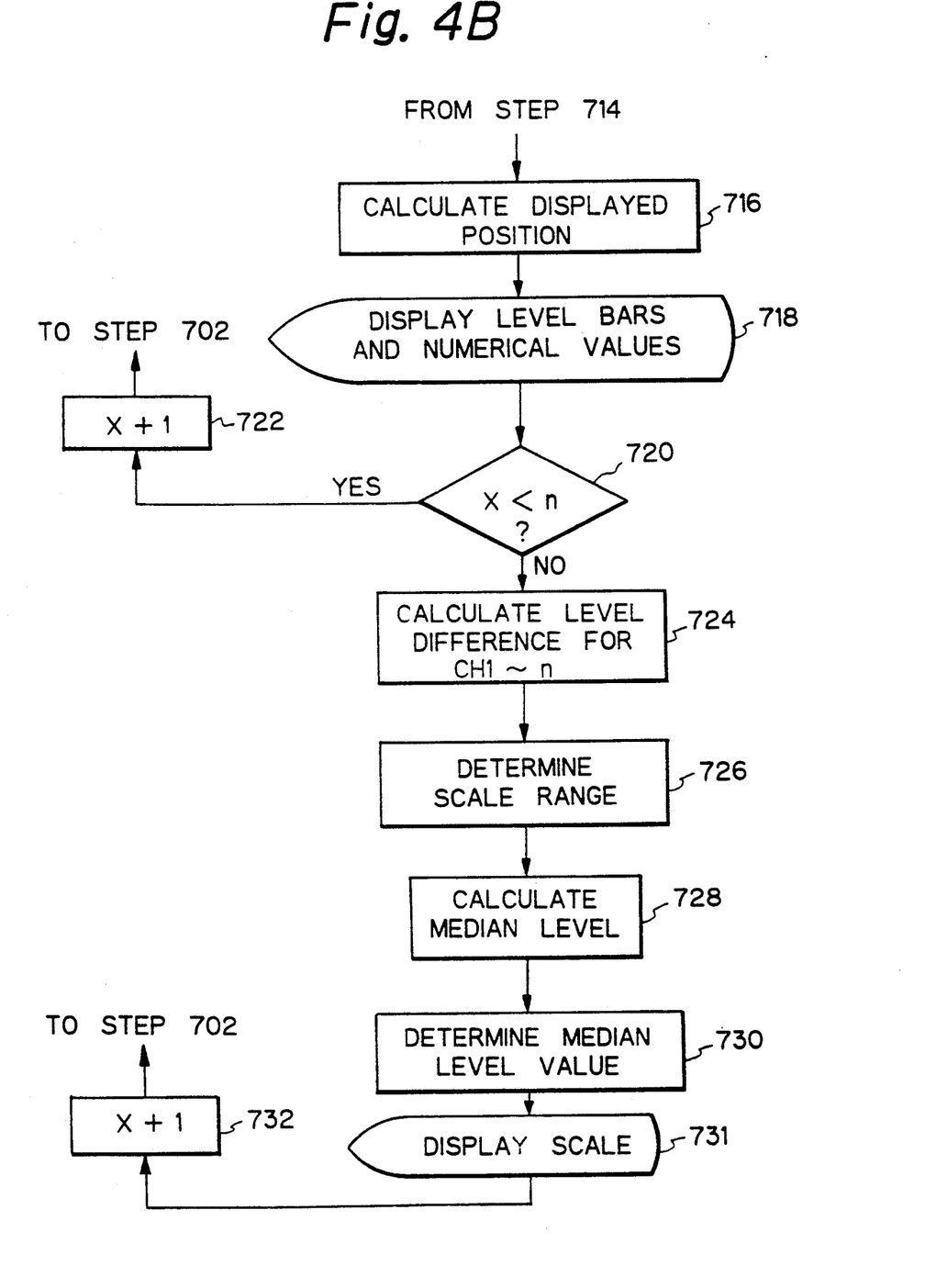

Referring now to FIGS. 4A and 4B, a multi-channel display flow executed by the control circuit 7 will be described hereinafter.

In the multi-channel display flow shown in FIG. 4A, it is assumed that channels CH 1-CH n (in this instance, channels CH 1-CH 8 correspond to TV channels 1, 3, 4, 6, 8, 10, 12 and 42, respectively, in a group PRG2) and a numerical-level-value displayed channel (channel CH 1 in this instance) have been set at the first step 700. Here, the method of setting channels CH 1-CH 8 will be briefly explained. As a first method, channels CH 1-CH 8 are set by the foregoing "CH SEARCH" key in the following manner: 1) Every eight of the 32 channels selected by the key manipulation as described above are stored in memories TMPs (TEMPORARY) 1-4 in the frequency increasing order; 2) One of TMP1-TEP4 to be programmed is selected by the "PRG RECALL" key; 3) A "PRG WRITE" key is pressed; 4) One of the function keys F-1-F-4 respectively for specifying the channel groups PRG1-PRG4 is pressed to program a group of channels stored in the selected memory TMP into a channel group memory PRG corresponding to the pressed function key. By repeating the above steps 1)-4), the channel groups PRG1-PRG4 can be programmed. A second channel setting method (a method of changing the setting of any of channel CH 1-CH 8 from one channel to another in a selected channel table) uses MEASURE keys and EDIT keys and comprises the following steps as will be understood from the foregoing explanation of the keys: 1) Selecting a channel group to be changed by the PRG RECALL key; 2) Selecting a CH name item by using the ITEM key (changing the display from PRGn to TMPn); 3) Positioning a cursor (mark 95) to a location (within the region 93) to be changed by the CHANNEL key; 4) Changing a channel by the CHARACTER key; and 5) Programming the channel change in a selected one of PRG1-PRG4 by pressing the PRG WRITE key and one of the function keys after the change has been completed. A third method (a method of changing the setting of any of channels CH 1-CH 8 from a channel of a frequency in a selected channel table to one not in the table) also uses the groups of MEASURE keys and EDIT keys in a manner similar to the second method and comprises the following steps: 1) Selecting a channel group by the PRG RECALL key; 2) Positioning the cursor to a location to be changed by the CHANNEL key; 3) Selecting a frequency item by the ITEM key; 4) Positioning the cursor to a digit to be changed by the POSITION key; 5) Changing the value of the digit by the CHARACTER key; 6) Changing a CH name item by the same key manipulations as the steps 3), 4) and 5) after the value has been changed; and 7) Pressing the PRG WRITE key after the change of the CH name item has been completed. Then, the change is programmed in one of PRG1-PRG4 by the same manipulation as the second method.

Referring back to FIG. 4A, at step 701, relatively fixed images (for instance, channel numbers 1:P ... 42:P, PRG2, the rectangular mark 95 indicating a specified channel, and other character and numerical images shown in FIG. 3) are displayed. Then, a channel number X is set to "1" at step 702, and then a level measuring/display processing for the channel 1 by a group of the subsequent steps 704-720 is executed. Specifically, first at step 704, the frequency of the TV channel 1 (i.e. picture frequency in the instance shown in FIG. 3) is searched from a channel-frequency table stored in the memory, and a division ratio corresponding to the frequency is outputted to the counter 612 so that the tuner set in a receiving state for the channel 1. Next, at step 706, the programmable attenuators (P.ATTs) 600, 606 are adjusted so that the received TV signal level of the channel 1 falls within the predetermined dynamic range of 9 dB mentioned before. Specifically, the P.ATT 600, which can be set, for example, to one of three ratios of 0, 30 and 50 dB, and the other P.ATT 606, which can be set, for example, to fourteen ratios from 0 to 65 dB with 5 dB steps, are adjusted to set a 65 dB ratio (i.e. 30 dB at P.ATT 600 plus 35 dB at P.ATT 606) which usually correlates to the middle of a displaying dynamic range of 100 dB. Then, if the TV signal level is within the predetermined 9 dB dynamic range, the 65 dB ratio is determined to constitute a proper range, and the flow proceeds to the next step 708. On the contrary, if it is not in that predetermined dynamic range, the attenuation rate is decreased by 30 dB when it is below the predetermined dynamic range while increased by 30 dB when above the dynamic range. Then, it is again determined whether or not the TV signal is within the predetermined dynamic range. If the TV signal is still out of the range after the adjustment, the attenuation ratio is likewise changed with a changing amount of 15 dB. Thus, the adjustment of the attenuation ratio is continued while switching an attenuation changing amount to 10 dB and 5 dB, until the TV signal level falls within the predetermined dynamic range. In this manner, an appropriate range for each channel is determined by changing the attenuation ratio maximum five times. (Finally determined attenuation ratios for a group of channels at the last measurement cycle are stored and then called to be used for corresponding channels at the subsequent measurement cycles. If the TV signal of a channel does not fall within a proper range set by the called attenuation ratio, the ratio is set to the above-mentioned 65 dB, and then the attenuation ratio is changed as described above.)

When the TV signal level of the channel 1 enters the proper range, the level from the level comparator 610 is read at the next step 708 and stored at step 710. Then, at step 712 the stored level is combined with the total attenuation ratio set at step 706 to calculate a detected level of the TV signal of the channel 1. Since the channel 1 is a specified channel, the detected level of the channel 1 is fetched at step 714 (its digital value is 76.1 dB$\mu$V in the instance shown in FIG. 3). Next, at step 716, a position on the screen for displaying a bar 96 (FIG. 3) representing the detected level of the channel 1 is calculated from the value computed at step 712 and a scale. The bar 96 and a corresponding digital value are displayed at step 718. It should be noted that the level bars (including 96, 97, 98), the digital level value of a specified channel and the scale described hereinafter are displayed in a time-division manner.

At step 720, since X (=1) is smaller than n (=8), the value X is incremented by one at step 722, and then the above described process is repeated for the channel CH 2 (i.e., the TV channel 3 in this instance). After the measuring/display loop has been repeated n times and the n-th bar (i.e. bar for TV channel 42 in this instance) has been displayed, an answer at step 720 is NO. Then, a scale determination/display process is executed at steps 724–731.

Figure 5:
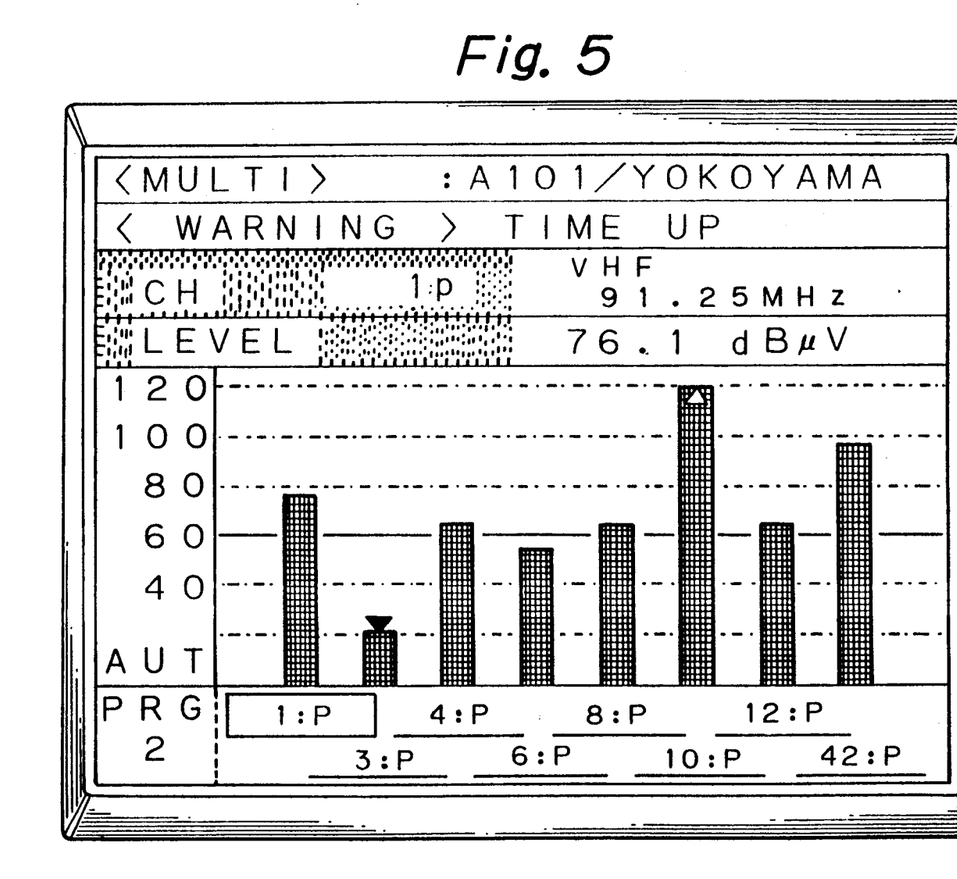
FIG. 5 is a diagram illustrating another display on a screen shown in FIG. 3.

Explaining next the scale determination/display process, at the first step 724, the difference between the maximum and minimum values of the detected levels for the channels CH 1–CH n is calculated. Then, a scale range is determined corresponding to the magnitude of the level difference. For example, if the difference is less than 12 dB; between 10 and 30 dB; between 25 and 60 dB; and between 50 and 100 dB, the range is established with 2 dB/DIV; 5 dB/DIV; 10 dB/DIV; and 20 dB/DIV, respectively. When the range is changed, a hysteresis operation is performed. At the next step 728, a median level is calculated from the maximum and minimum level values, and the value of the median level of the scale is determined at step 730. The data obtained at the above steps 724–730 are displayed in the scale display region 91 at step 731. Finally at step 732, the value X is incremented by one (whereby the value X is returned to 1), followed by the flow returning to step 702. The above described process is repeated for the channels CH 1–CH n until an interrupt occurs due to a change of the channel group PRG, power-off, or the like. During the above process is executed, when the meter of the present invention is used in adjusting the orientation of an antenna, a bar display, a digital value display and the scale change, for example, as shown in FIG. 5, each time the antenna is moved. Referring to FIG. 5, since the level of a signal received at the TV channel 3 is below 20 dB a triangular sign directed downward is added to the bar representing the detected level of the channel 3. Also, since the level of a signal received at the TV channel 10 is above 120 dB, a white triangular sign directed upward is added on the bar for the TV channel 10. Thus, even if levels of signals at different TV channels largely fluctuate, they are all displayed at the same time.

While an embodiment of the invention has been described, the following changes are possible. First, the image representing a level of each TV channel may be another graphical representation other than the bar chart as employed in the illustrative embodiment. Secondly, although the number of bars simultaneously displayed on the screen is determined to be eight, this number may be changed if necessary as long as the level image display region on the screen permits. It is also possible to change the number of bars displayed on the screen depending on the number of designated channels. Further, while the number of channels whose signal levels are digitally displayed is one in the foregoing embodiment, the number of such channels may be increased if necessary. Also, the digital values of levels of all channels may be displayed on the screen.

According to the TV signal level meter described above in detail, a level of a signal received at each TV channel is individually measured by adjusting the programmable attenuators, so that the measurement and display can be carried out over a wide dynamic range, thereby making it possible to graphically display the levels of signals for a maximum number of TV channels displayable on the screen at the same time. It is therefore possible to adjust equipment to be measured such as an antenna while simultaneously confirming the levels of all displayed channels. Also, the frequency of a channel switching operation can be minimized and a manual switching of the attenuators can be made unnecessary, thereby facilitating manipulations of the meter during measurement.

What is claimed is:
1. A television signal level meter comprising:
(A) channel setting means for setting a plurality of television channels, the levels of which are to be measured;
(B) level measuring means coupled to receive an input for detecting in said input the levels of signals received in each of said plurality of television channels and storing the detected signal levels; and
(C) display means responsive to said plurality of television channels from said channel setting means and a plurality of said stored levels from said level measuring means, including:
 i) a plurality of level image display regions for displaying signal levels for the plurality of channels in a predetermined scale; and
 ii) a plurality of channel number image display regions for displaying channel numbers associated with the plurality of channels, respectively, the positions of said plurality of channel number image display regions being correlated to the positions of said plurality of level image display regions, respectively,
 iii) display control means comprising:
  (a) scale forming means responsive to said plurality of stored signal levels for detecting maximum and minimum values thereof and forming said predetermined scale having a range depending on the maximum and minimum values;
  (b) level image forming means responsive to said plurality of stored signal levels for forming said level images representing said signal levels; and (c) number image forming means responsive to said plurality of channels for forming number images representing the numbers of said channels.

2. A television meter according to claim 1 further comprising means for specifying in said plurality of channels at least one channel the signal level of which is to be displayed by a numerical value, wherein said display means further comprises at least one numerical level value image display region for displaying a numerical level value image of a channel; and wherein said display control means comprises numerical level value image forming means responsive to a specified channel from said specifying means for forming an image representing the numerical value of said stored signal level of the specified channel.

3. A television meter according to any of claims 1-2, wherein said level image forming means forms a number of level images corresponding in number to the plurality of channels.

4. A television signal level meter according to claim 1 wherein said display means further comprises at least one channel image display region for displaying a channel number and frequency of a channel.

5. A television signal level meter according to claim 2, further comprising data storage means for storing data representing measured levels in a memory.

6. A television signal level meter according to any of claims 1-2 wherein said display means updates the level image display regions in response to changes in the signal levels of the plurality of channels.

7. A method of measuring and simultaneously indicating signal levels for a plurality of television channels comprising the steps of:

(a) setting a plurality of television channels, the levels of which are to be measured;

(b) receiving an input signal;

(c) detecting in the input signal the level of signals received in each of the plurality of television channels;

(d) storing the detected signal levels;

(e) displaying signal levels for the plurality of channels in a plurality of level image display regions; and (f) displaying channel numbers associated with the plurality of channels in a plurality of channel number image display regions, wherein the step of displaying signal levels further comprises the steps of:

(i) scaling the detected signal levels to determine a display scale, and (ii) displaying said detected signal levels in accordance with said display scale.

8. The method of claim 7 further comprising the steps of:

(g) selecting a specific channel from the plurality of channels, and (h) displaying a channel number and channel frequency of the specific channel.

* * * * *

UNITED STATES PATENT AND TRADEMARK OFFICE
CERTIFICATE OF CORRECTION

PATENT NO. : 5,291,285

DATED : March 1, 1994

INVENTOR(S) : Itoshi Yokoyama et al

It is certified that error appears in the above-identified patent and that said Letters Patent is hereby corrected as shown below:

On the title page, Item [73] Assignee: "Leader Electronics, Yokohama, Japan" should read --Leader Electronics Corp.--

Signed and Sealed this

First Day of November, 1994

*Attest:*

BRUCE LEHMAN

*Attesting Officer*     *Commissioner of Patents and Trademarks*